Jan. 22, 1924. 1,481,603

M. GÜTTNER

SUPPORTING OF THE PISTON IN ROTARY ENGINES

Filed Aug. 29, 1922

Inventor
M. Güttner
By Marks & Clerk Attys.

Patented Jan. 22, 1924.

1,481,603

UNITED STATES PATENT OFFICE.

MAX GÜTTNER, OF SCHMOLLN, GERMANY.

SUPPORTING OF THE PISTON IN ROTARY ENGINES.

Application filed August 29, 1922. Serial No. 585,041.

*To all whom it may concern:*

Be it known that I, MAX GÜTTNER, a citizen of the German Republic, residing at Schmolln, Germany, have invented certain new and useful Improvements in Supporting of the Pistons in Rotary Engines, of which the following is a specification.

This invention relates to a special supporting of the piston in rotary engines, such as blowers, pumps, compressors or other engines in which a circular working piston connected with the casing by a resistance slide valve is moved in a casing by means of an eccentric.

It has already become known to support such a piston elastically with the aid of helical springs exerting a pull radially to the axis, so that the piston can move away from the wall if it should encounter solid bodies in the casing.

This invention has for its object not so much to enable the giving way of the piston but to ensure a premanent keeping tight between the piston and the wall of the cylinder notwithstanding the mounting of the cylinder is less elastic than usual. The inconvenience connected with the arrangements of known type consists in that at higher pressures the piston is lifted off the wall of the casing already by this pressure alone whereby the keeping tight between wall of the casing and piston was disturbed. For this reason it was not possible to work with higher pressures if the engine had to work for instance as compressor.

These inconveniences are avoided by the invention in inserting between piston and shaft a transmission element which is capable, in preserving a certain elasticity of the piston, to press the same against the wall of the casing with maximal force and to ensure thus the keeping tight between the two parts.

An embodiment of the invention is illustrated by way of example on the accompanying drawing.

Figure 1:
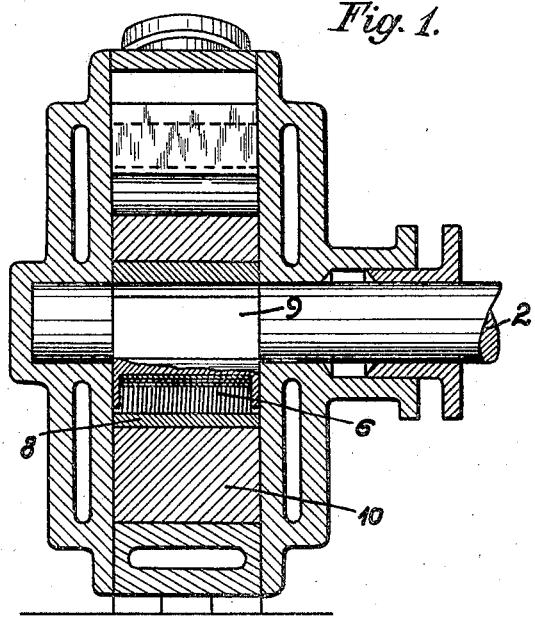
Fig. 1 is a longitudinal section through a rotary engine.
Figure 2:
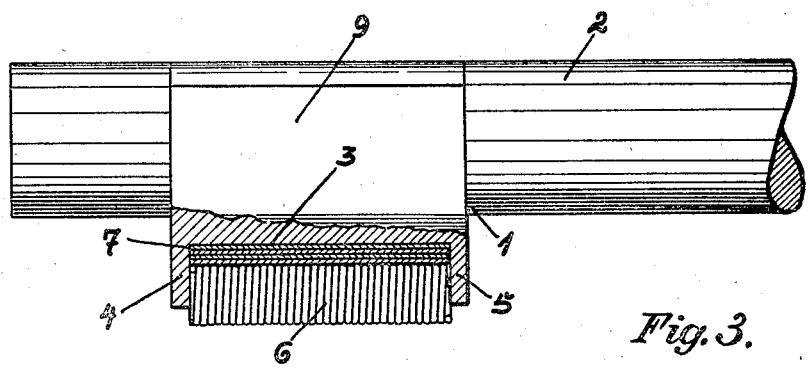
Fig. 2 shows in elevation on larger scale the supporting element embedded in the eccentric of the shaft.

According to this invention a longitudinal groove 3, preferably of quadrangular cross section, is cut into the eccentric 1 of shaft 2, said groove being limited at the ends by walls 4 and 5. A straight elastic body of circular cross section, for instance a helical spring 6, is located in this groove so that the individual windings of the same are one with the other in contact and so that the ends of the spring bear against the walls 4 and 5. The straight elastic body, being thus embedded, cannot give way to any side and if loaded by the piston its circular cross section will merely be altered for instance to a quadrangular cross section in adapting itself to the shape of the groove 3, to resume the circular cross section as soon as the loading ceases. A determined preliminary tension can always be given to the elastic body with the aid of plates 7 to be inserted in the groove.

A sleeve 8 is placed in a manner known per se over the eccentric and the straight elastic body, this sleeve being guided laterally upon the flat walls 9 of the eccentric and serving to communicate with its outer surface the desired movement to the piston 10.

Figure 3:
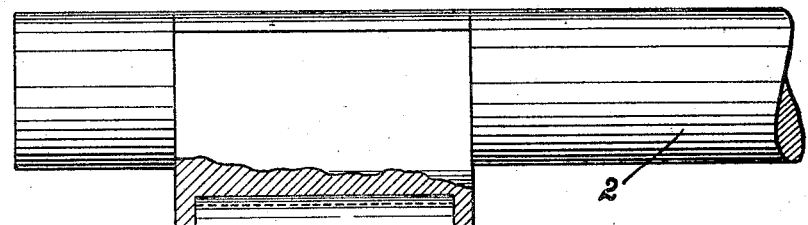
Fig. 3 shows in elevation another form of construction of the supporting element also on a larger scale and embedded in the eccentric of the shaft.

In the form of construction shown in Fig. 3 a tube 11 serves as straight elastic body which is capable also to exert a strong contact pressure and possesses nevertheless sufficient elasticity to prevent the seizing of the piston.

I claim:—

1. Supporting of the piston in rotary engines comprising in combination a shaft, an eccentric of said shaft having a longitudinal groove with limiting surfaces at both ends, a straight slightly elastic body embedded in its longitudinal direction in said groove and a sleeve enclosing said eccentric and said straight elastic body.

2. Supporting of the piston in rotary engines comprising in combination with a shaft, an eccentric of said shaft having a longitudinal groove with limiting surfaces at both ends, a helical spring embedded in its longitudinal direction in said groove, the winding of said helical spring being in mutual contact, and a sleeve enclosing said eccentric and said helical spring.

3. Supporting of the piston in rotary engines comprising in combination with a shaft, an eccentric of said shaft having a longitudinal groove with limiting surfaces at both ends, an elastic tube embedded in said groove, and a sleeve enclosing said eccentric and said elastic tube.

4. Supporting of the piston in rotary engines comprising in combination with a shaft, an eccentric of said shaft having a longitudinal groove of quadrangular cross section with vertical limiting surfaces at both ends, a helical spring embedded in its longitudinal direction in said groove, the winding of said helical spring being in mutual contact, and a sleeve enclosing said eccentric and said helical spring.

5. Supporting of the piston in rotary engines comprising in combination with the shaft, an eccentric upon said shaft having a longitudinal groove of quadrangular cross section with vertical limiting surfaces at the ends, a helical spring embedded in said groove the windings of said helical spring being in mutual contact, a sleeve enclosing said eccentric and said helical spring, parallel inner faces in said sleeve, parallel side faces of said eccentric permitting of a radial movement of said sleeve, and plates inserted in the groove of the eccentric.

6. Supporting of the piston in rotary engines comprising in combination with the shaft, an eccentric upon said shaft having a longitudinal groove of quadrangular cross section with vertical limiting surfaces at its ends, an elastic tube embedded in said groove, a sleeve enveloping said eccentric and said elastic tube, parallel inner faces in said sleeve, parallel side faces of said eccentric permitting of a radial movement of said sleeve, and plates inserted in the groove of the eccentric.

In testimony whereof I affix my signature.

MAX GÜTTNER.